United States Patent
Malott

[15] 3,664,236
[45] May 23, 1972

[54] RESISTANCE LOCKING CYLINDER

[72] Inventor: Richard C. Malott, 321 North Jackson, Spring Lake, Mich. 49456

[22] Filed: Feb. 13, 1970

[21] Appl. No.: 11,213

[52] U.S. Cl.................................................92/26, 118/67
[51] Int. Cl........................................................F15b 15/26
[58] Field of Search....................92/26, 27, 28, 20, 15, 14, 92/53, 29, 51, 52, 30, 23, 65; 188/67

[56] References Cited

UNITED STATES PATENTS

| | | | |
|---|---|---|---|
| 1,910,121 | 5/1933 | Muntz | 188/67 |
| 2,716,965 | 9/1955 | Klamp | 92/51 X |
| 2,961,837 | 11/1960 | Suderow | 92/51 X |
| 3,150,563 | 9/1964 | Carrigan et al. | 92/52 X |
| 3,429,233 | 2/1969 | Wright | 92/27 X |
| 3,444,783 | 5/1969 | Fredd | 92/26 X |
| 2,988,058 | 6/1961 | Warnecke | 92/28 |

Primary Examiner—Edgar W. Geoghegan
Assistant Examiner—Leslie J. Payne
Attorney—John E. McGarry

[57] ABSTRACT

This disclosure relates to a table with a variable shape surface and locking cylinder therefor wherein the table is comprised of a plurality of vertically disposed resistance locking cylinders, each of which has a piston rod, the upper portion of which forms a portion of the variable shape surface. The piston rod is locked in place by a plurality of wedging members within the cylinder, the wedging members being forced against the piston rod when the piston rod encounters substantial resistance as it is extended.

5 Claims, 7 Drawing Figures

Patented May 23, 1972

INVENTOR.
RICHARD C. MALOTT
BY John E. McGarry

Patented May 23, 1972

INVENTOR.
RICHARD C. MALOTT
BY John E. McGarry

Patented May 23, 1972

INVENTOR.
RICHARD C. MALOTT
BY John E. McGarry

RESISTANCE LOCKING CYLINDER

This invention relates to a variable shape surface and resistance locking cylinder therefor. In one of its aspects it relates to a resistance locking cylinder having a piston rod which is locked in place by the clamping action of wedging members when fluid pressure is supplied to the cylinder to extend the piston rod and when the piston rod meets substantial resistance.

In another of its aspects, the invention relates to a variable shape surface for a work table and the like comprising a plurality of vertically disposed cylinders having piston rods adapted to move vertically with respect to the table top. Each of the cylinders has means to lock each piston rod in a fixed position when it meets substantial resistance, even when the resistance has been removed, until the piston rod is reset.

There are many automated operations which require a work surface of varying contour. For example, when working with fiberglass molding, the surface of a part can be quite varied. Each part may require shaping, cutting, and/or boring operations. These operations can be performed by hand or by machines which are programmed to perform each operation. The work surface used in these operations must be variable to meet the varied contour of different parts, but must be capable of being semi-permanently fixed in a given contour to accommodate the shape of a plurality of identical parts.

I have now discovered that such a surface can be provided by a plurality of resistance locking cylinders whereby a given work surface can be quickly set and maintained for a plurality of work pieces and yet permit quick change to another entirely different contour.

By various aspects of this invention, one or more of the following, or other, objects can be obtained.

It is an object of this invention to provide a work surface whose shape can vary according to a desired configuration and which surface can be easily fixed in a desired configuration as well as modified to other configurations.

It is another object of this invention to provide a simplified resistance locking cylinder having an extendible piston rod which can be locked in a given position by resistive force against the piston rod as it is extended.

Other aspects, objects, and the several advantages of this invention are apparent to one skilled in the art from a study of this disclosure, the drawings, and the appended claims.

According to the invention, there is provided a resistance locking cylinder having an annular body with a closure at each end forming a chamber within the body. Fluid inlet ports are provided at each end of the chamber and a piston is axially slidable within the chamber. A piston rod is fixed to the piston and extends through one of the closure means at one end of the chamber. A locking piston is positioned between one end of the cylinder and the piston and is axially slidable within the chamber with respect to the piston and piston rod. Wedging means are carried by the locking piston and engageable with the piston rod. Means are provided at one end of the cylinder for forcing the wedging members into locking engagement with the piston rods when the locking piston is forced up to one end of the cylinder. Fluid passage means are provided between one of the fluid inlet ports and each side of the locking piston to permit movement of the locking piston into the one end of the chamber after the piston has moved to a position at which it is restrained from further movement.

Further, according to the invention, there is provided a work table comprising a plurality of resistance locking cylinders, each having a piston rod extending upwardly of the cylinder with the top portions thereof forming a work surface of the table. Each of the cylinders has a piston axially slidable within the cylinder to move its respective piston rod vertically with respect thereto. Each of the cylinders has means for releasably locking each of the piston rods in a predetermined position when the piston rod has encountered a substantial resistance to further movement.

The invention will now be described with reference to the accompanying drawings in which.

Figure 1:
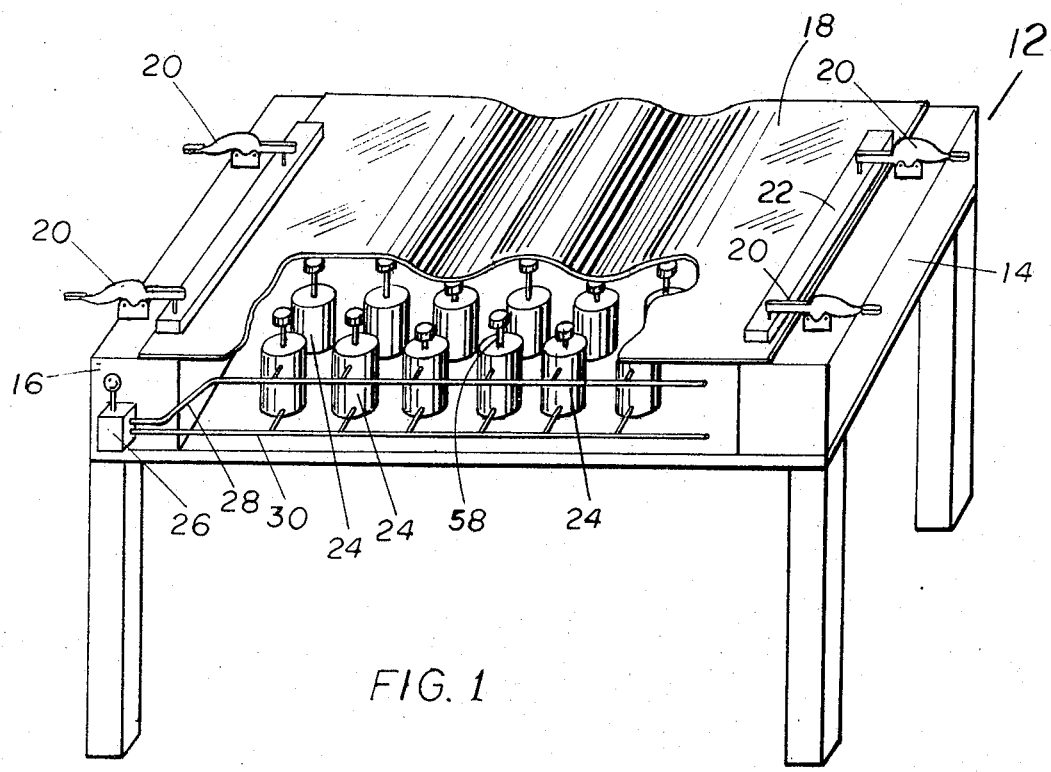
FIG. 1 is a perspective view of a variable shape surface illustrating one embodiment of the invention.

Referring now to the drawings, there is shown a table 12 having side blocks 14 and 16 and a work piece 18 held in place on the side blocks 14 through hold down clamps 20 and bars 22. A plurality of resistance locking cylinders 24 are supported between the side blocks 14 and 16. Each of the resistance locking cylinders 24 has an extendible piston rod 58, the upper portion of which forms a part of the variable surface. Each of the cylinders is operated by a control valve 26 which supplies fluid pressure through fluid lines 28 and 30 to each cylinder.

Figure 2:
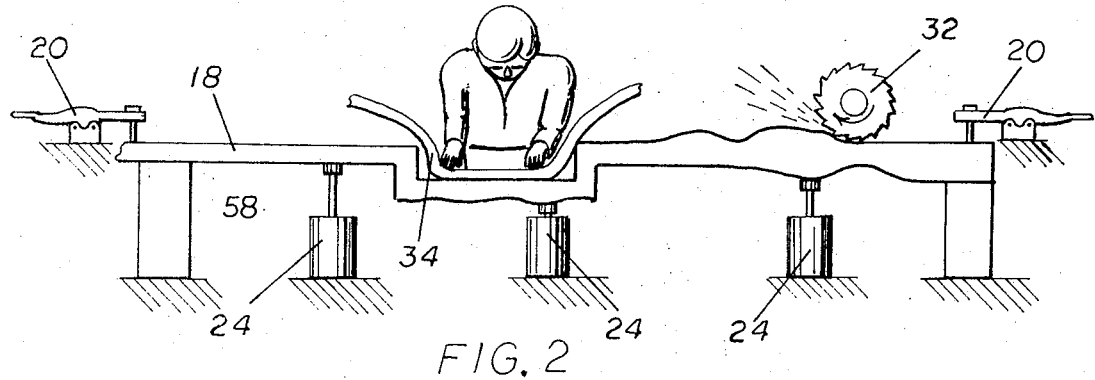
FIG. 2 is a schematic illustration of various operations which can be performed on the table illustrated in FIG. 1.
Figure 3:
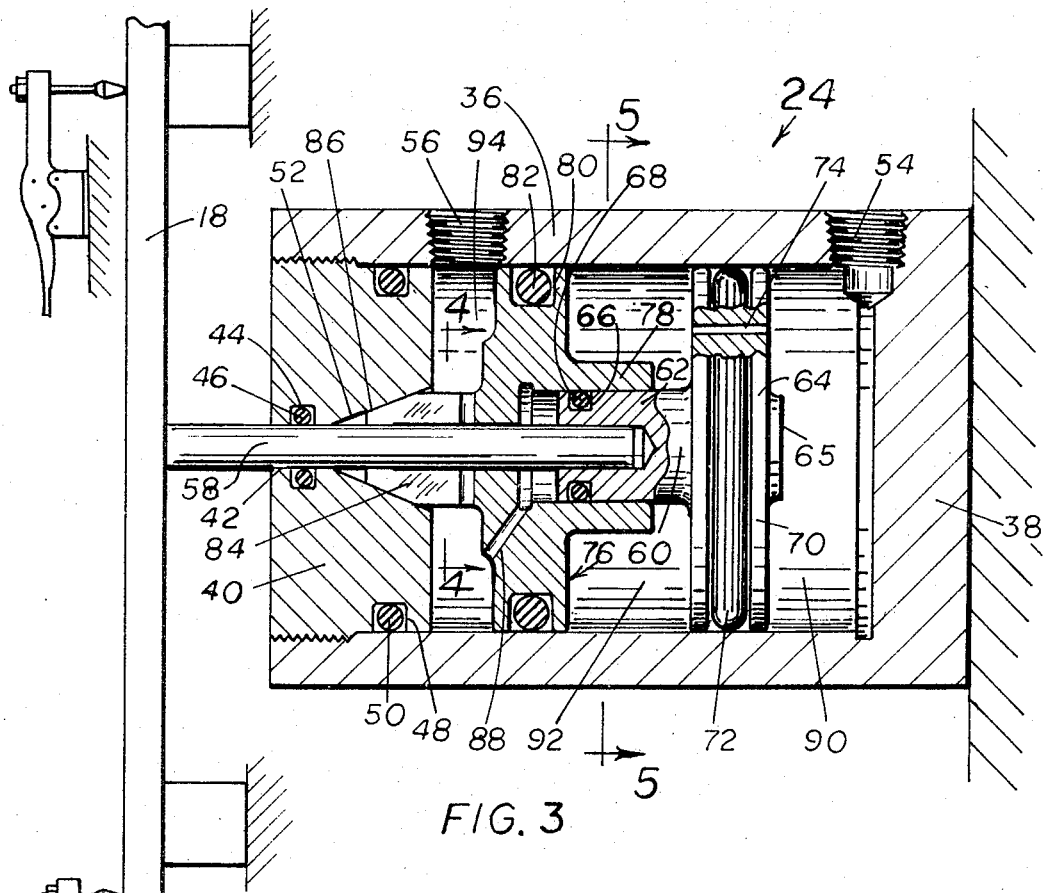
FIG. 3 is a sectional view through a resistance locking cylinder according to one embodiment of the invention.
Figure 4:
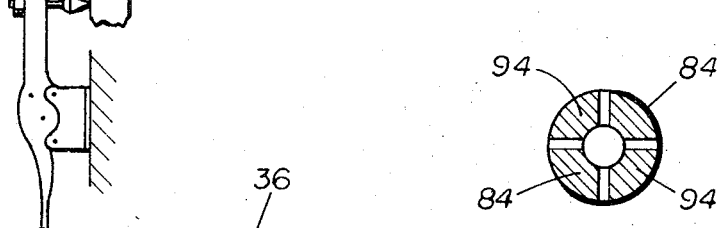
FIG. 4 is a partial sectional view through lines 4—4 of FIG. 3.
Figure 5:
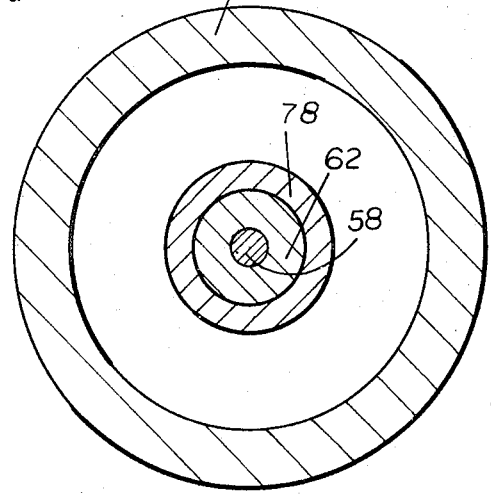
FIG. 5 is a sectional view taken along lines 5—5 of FIG. 3.

As illustrated in FIG. 2, various operations can be carried on simultaneously on any shape work piece supported by the resistance locking cylinders. For example, a grinding or cutting operation such as with cutter 32 can be taking place at one portion of the table while manual forming or molding operations such as at depression 34 can be taking place at other parts of the table. Various machines can work on the work piece 18 simultaneously, and can be operated by personnel or can be programmed to be operated as by a computer, for example.

Reference is now made specifically to FIGS. 3 through 7. Each resistance locking cylinder 24 has an annular cylindrical body 36 having a closed bottom end 38 and a closure plug 40 at the top portion thereof. A bore 42 is formed in the closure plug 40 and an annular counter bore 44 forms a cavity for an O-ring 46. An annular cavity 48 is machined in the outer circumference of the closure plug 40 to position an O-ring 50 therein for sealing the closure plug 40 to the cylindrical body 36. A conical recess 52 is machined into the closure plug 40 at the inner terminal end of the bore 42.

The cylindrical body 36 has a fluid inlet port 54 and a fluid outlet port 56 at different ends of the chamber formed by the cylindrical body and the closure plug 40.

A piston rod 58 is fixed at one end to a piston 60 and extends out through the bore 42 in the closure plug 40 with the O-ring 46 in sealing relationship between the closure plug 40 and the piston rod 58. The piston 60 has an upper cylindrical portion 62 and a lower disc-like portion 64 with a raised abutment 65 at the bottom thereof. An annular cavity 66 is formed in the outer surface of the upper cylindrical portion 62 to seat O-ring 68. An annular cavity 70 is formed in the outer surface of the lower portion 64 of the piston 60 to seat O-ring 72. A bleed passage 74 is bored through the body of the lower portion 64 to permit pressure to bleed from beneath the disc-like lower portion 64 to the area thereabove. The O-ring 72 provides a sealing relationship between the bottom portion 64 of the piston 60 and the inner walls of the cylindrical body 36. The piston 60 is thus axially slidable within the cylindrical body 36 to extend and retract the piston rod 58.

Also axially slidable within the cavity of the annular cylindrical member 36 is a locking member 76. An annular lower portion 78, having an annular cavity 80, and wedge members 84, having inclined outer surfaces 86, comprise the locking member 76. An O-ring 82 is provided in annular cavity 80 to seal the locking member 76 within the annular cylindrical body 36. Further, the annular lower portion 78 receives the upper cylindrical portion 62 of the piston 60 with the O-ring 68 forming a seal therebetween. A bleed port 88 is provided between the upper portion of the locking member 76 and the cavity formed by the annular lower portion 78. The inclined surfaces 86 mate with the conical recess 52 to wedge members 84 against the piston rod 58 when the locking member 76 is in the position illustrated in FIG. 3.

The piston 60 and the locking member 76 thus divide up the space within the annular cylindrical body 36 into a first chamber 90, formed between the piston 60 and the closed bottom end 38, a second chamber 92, formed between the piston 60 and the locking member 76, and a third chamber 94, formed between the closure plug 40 and the locking member 76.

Figure 6:
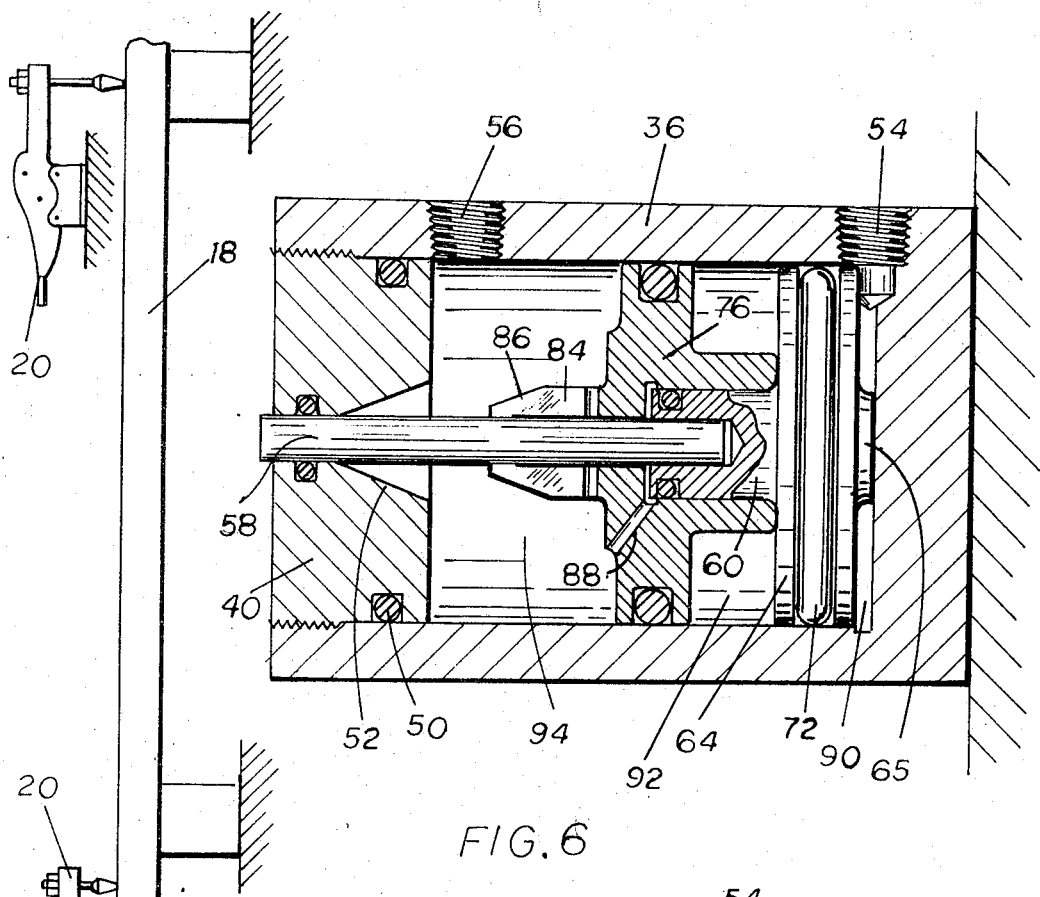
FIG. 6 is a sectional view similar to FIG. 3 illustrating the piston rod in its retracted position.
Figure 7:
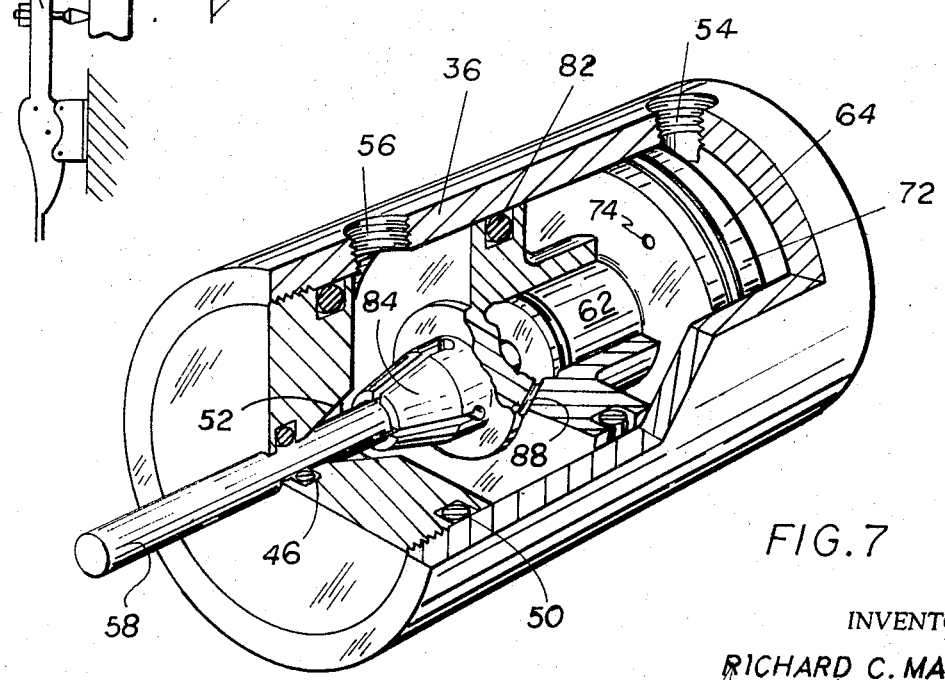
FIG. 7 is a perspective view, partially cutaway, further illustrating the locking cylinder shown in FIGS. 3 through 6.

In operation, the piston will initially be in a position illustrated in FIG. 6. Fluid pressure is introduced through fluid inlet port 54 into the first chamber 90. This fluid pressure can be supplied through a fluid pressure line 30, for example. This pressure will cause the piston 60 and the locking member 76 to move toward the opposite end of the cylinder thereby moving a piston rod 58 upwardly until the top portion thereof strikes the work piece 18 or a pattern for the work piece. During this time, fluid pressure will be exhausted from chamber 94 through port 54 and, for example, through fluid line 28. At this point, the piston 60 will cease its upward movement and the pressure within chamber 90 will pass through the bleed passage 74 into the second chamber 92 thereby moving the locking member 76 upwardly until the inclined outer surfaces 86 register with the conical recess 52. The upward force of the locking member 76 against the conical recess 52 will cause the wedge members 84 to be pushed inwardly in gripping contact with the piston rod 58. The pressure in the second chamber 92 is then equal to the pressure within the chamber 90. The pressure in the second chamber 92 will therefore substantially equalize the forces on either side of the piston 60. The pressure will further maintain an upward force on the locking member 76 to keep the wedge members 84 securely in gripping contact with the piston rod 58. In this manner, when the work piece 18 is removed, the piston rod 58 will be maintained in the same position. Thus, additional work pieces having the same configuration or the same desired configuration can be then put on the table and worked in any suitable manner.

When it is desired to change the configuration of the table, then the fluid pressure is exhausted from the inlet port 54 and fluid pressure is supplied to the fluid outlet port 56. This immediately forces the locking member 76 away from the upper end of the cylinder to disengage the wedge members 84 from gripping contact with the piston rod 58. The fluid pressure in chamber 94 then forces both the locking member 76 and the piston 60 downwardly with respect to the cylinder thereby withdrawing the piston rod 58 until the condition illustrated in FIG. 6 is reached. The new surface can then be formed in a manner which has been described hereinbefore.

The force on the locking member 76 will generally be sufficient in order to adequately hold the piston rod in a fixed position. However, for heavier or more industrial operations, the piston rod and the inner surfaces of the wedge members 84 can have roughened surfaces to provide a tighter gripping action of the wedge members 84 on the piston rod 58.

As used herein, the term fluid pressure is intended to mean hydraulic or pneumatic pressure. Therefore, the resistance locking cylinder according to the invention can be operated with a pneumatic system or a hydraulic system depending on availability and the requirements of the use.

Reasonable variation and modification are possible within the scope of the foregoing disclosure, the drawings, and the appended claims without departing from the spirit of the invention.

The embodiments of the invention in which an exclusive property of privilege is claimed are defined as follows:

1. A resistance locking cylinder having:
    an annular body;
    closure means closing each end of said cylinder to form a chamber within said body;
    fluid inlet ports at each end of said chamber;
    a piston axially slidable within said chamber;
    a piston rod fixed to said piston and extending through one of said closure means at one end of said chamber;
    a locking member between said one closure means and said piston, said locking member being axially slidable within said chamber and with respect to said piston and piston rod;
    wedging members carried by said locking member and engageable with said piston rod;
    means at said one end of said cylinder for forcing said wedging members into locking engagement with said piston rod when said locking member is forced up to said one end of said cylinder; and
    fluid passage means between one of said fluid inlet ports and each side of said locking member to permit movement of said locking piston into said one end of said chamber after said piston has moved to a point where it is restrained from further movement.

2. A resistance locking cylinder according to claim 1 wherein said locking member is axially slidable on an upper portion of said piston.

3. A resistance locking cylinder according to claim 2 further comprising means forming a seal between said annular body and said locking member.

4. A resistance locking cylinder according to claim 1 wherein said wedging members extend axially and have inclined upper surfaces, and said wedging member forming means comprises an inwardly opening conical cavity in said one closure means.

5. A resistance locking cylinder according to claim 1 wherein said fluid passage means comprises a bleed hole through said piston.

* * * * *